(12) United States Patent
Nabuurs et al.

(10) Patent No.: US 6,390,542 B1
(45) Date of Patent: May 21, 2002

(54) OPEN ROOF CONSTRUCTION FOR A VEHICLE

(75) Inventors: Martinus Wilhelmus Maria Nabuurs, Overloon; Marcel Johan Christiaan Nellen, Oostrum/Venray; Joseph Petrus Johannes Sanders, Cuyk, all of (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/711,751

(22) Filed: Nov. 13, 2000

(30) Foreign Application Priority Data

Nov. 12, 1999 (NL) ............................................. 1013564

(51) Int. Cl.$^7$ .................................................. B60J 7/08
(52) U.S. Cl. ................................... 296/216.07; 296/223
(58) Field of Search ....................... 296/216.06–216.08, 296/218, 222, 223, 216.02

(56) References Cited

U.S. PATENT DOCUMENTS

| | | |
|---|---|---|
| 4,223,942 A | 9/1980 | DeLuca ..................... 296/222 |
| 4,728,146 A * | 3/1988 | Srdinko ................. 296/216.06 |
| 4,783,116 A * | 11/1988 | Hough ................... 296/216.07 |
| 6,073,995 A * | 6/2000 | Klein ..................... 296/216.02 |

FOREIGN PATENT DOCUMENTS

| DE | 92 07 948 U | 12/1992 |
|---|---|---|
| DE | 43 13 687 A | 11/1994 |

* cited by examiner

Primary Examiner—Dennis H. Pedder
(74) Attorney, Agent, or Firm—Westman, Chamlin & Kelly, P.A.; S. Koehler

(57) ABSTRACT

An open roof construction for a vehicle includes a frame mounted around a roof opening, a movable closure element connected thereto, and driving means for said closure element, which are mounted on said frame. The frame includes a lower frame present on the underside of the roof and an upper frame present on the upper side of the roof, which lower frame and which upper frame include fixing elements for fixing the two frames together while confining the edges of the roof opening. The driving means for the closure element are mounted on said lower frame. Said driving means are mounted on the lower frame largely outside the projection of the roof opening.

16 Claims, 2 Drawing Sheets

OPEN ROOF CONSTRUCTION FOR A VEHICLE

BACKGROUND OF THE INVENTION

The invention relates to an open roof construction for a vehicle, comprising a frame mounted around a roof opening, a movable closure element connected thereto, and driving means for said closure element, which are mounted on said frame, which frame includes a lower frame present on the underside of the roof and an upper frame present on the upper side of the roof, which lower frame and which upper frame include fixing elements for fixing the two frames together while confining the edges of the roof opening.

An open roof construction of this type is generally mounted in the following manner. The upper frame with the driving means already mounted thereon is inserted into the roof opening from above in a vertical movement. Then the lower frame is fixed to the upper frame from the inside of the vehicle by means of said fixing elements. In order to enable such vertical mounting of the upper frame, the driving means for the closure element must in principle be disposed within the projection of the roof opening. One drawback of this is the fact that said driving means partially overlap the roof opening, seen in vertical projection, in the mounted position of the open roof construction, as a result of which the effective roof opening is reduced.

In principle it would be possible with such vertical mounting to mount the driving means on the upper frame only after said upper frame has been fitted in the roof opening. In such a case the driving means may extend beyond the projection of the roof opening, therefore. One drawback of this solution, however, is the fact that the number of mounting steps is increased in this manner.

Finally it is also possible to mount an upper frame that is already fitted with the driving means, which extend beyond the projection of the roof opening (in the mounted position of the upper frame). In that case a vertical mounting movement is no longer possible, however, and it will be necessary to resort to a complicated tilting movement of the upper frame when said upper frame is being mounted in the roof opening.

SUMMARY OF THE INVENTION

The object of the invention is to provide an open roof construction of the present type by which the aforesaid drawbacks are eliminated in a simple yet efficient manner.

In order to accomplish that objective the open roof construction according to the invention is characterised in that the driving means for the closure element are mounted on the lower frame.

Since the lower frame does not need to be moved through the roof opening, but is placed in abutment with the roof opening from the inside, as is usual for a lower frame, the question whether it will be possible for the driving means to pass through the roof opening need not be taken into account. The upper frame can be mounted in the roof opening from above in the usual manner in a vertical mounting step, after which the lower frame and the driving means mounted thereon can be fixed to the upper frame from below by means of the fixing elements.

In a preferred embodiment of the open roof construction according to the invention the driving means are mounted on the lower frame largely outside the projection of the roof opening. In this way the driving means (such as a motor and guide tubes for driving cables of the closure element) no longer constitute an obstruction in the roof opening, as a result of which a larger effective roof opening is obtained while using the same dimension of the roof opening (and consequently of the closure element).

If the open roof construction is of the type wherein the driving means include guide tubes extending in the longitudinal direction of the vehicle and accommodating driving cables for the closure element, the guide tubes may for example extend beyond the roof opening at both ends. This enables a greater range of movement of the closure element while the roof dimension remains unchanged.

In order to enhance the ease with which the open roof construction according to the invention can be mounted, it is furthermore preferable that the lower frame and the upper frame include mating snap members. The mounting of such an embodiment of the open roof construction can be carried out single-handedly by one person. First the upper frame is placed into the roof opening, after which the lower frame is placed in abutment with the upper frame from inside and held in position by means of the mating snap members. Then the fixing elements, which may be of type that is known per se, can be fitted for definitively fixing the two frames together while confining the edges of the roof opening. The term "snap members" used herein must not be interpreted too narrowly. It also includes other means for effecting a preliminary connection between the lower frame and the upper frame, such as hook-in connections, for example. It is also possible to fit only the lower frame with such means, which can mate with the edges of the roof opening. Also in that case the ease of mounting is enormously enhanced.

The inventive concept allows a large degree of freedom as regards the design of the open roof construction. Even complicated open roof constructions intended for mounting at a later stage can be fitted in a simple manner in this way. The lower frame may have larger dimensions than the upper frame. Thus there is also a possibility of the frame being integral with a roof liner for the vehicle. The invention will be explained in more detail hereafter with reference to the drawing, which shows an embodiment of the open roof construction according to the invention.

DESCRIPTION OF THE ILLUSTRATIVE EMBODIMENT

Figure 1:
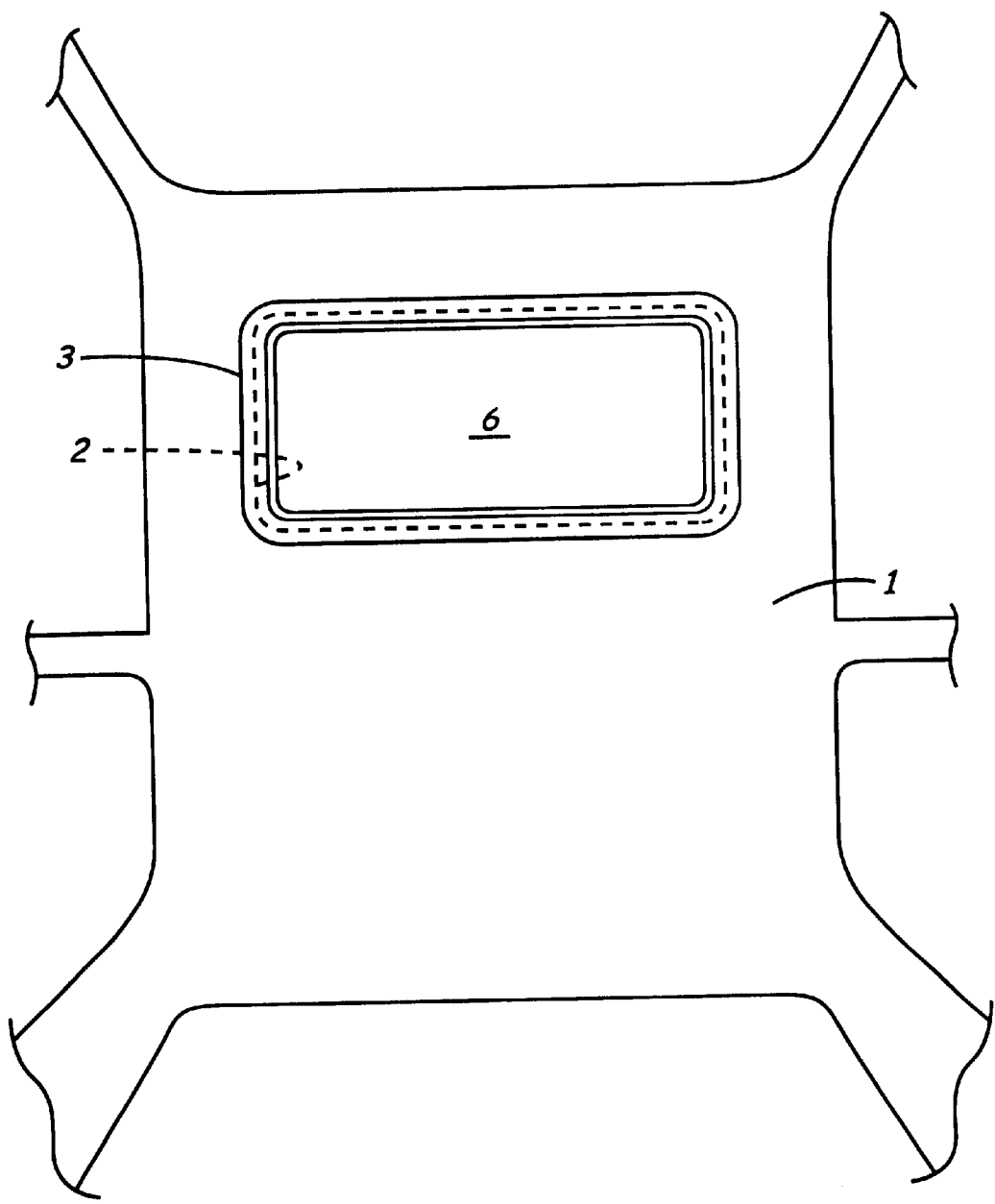
FIGS. 1 and 2 are a schematic top plan view and a schematic sectional view, respectively, of an embodiment of the open roof construction according to the invention.
Figure 2:
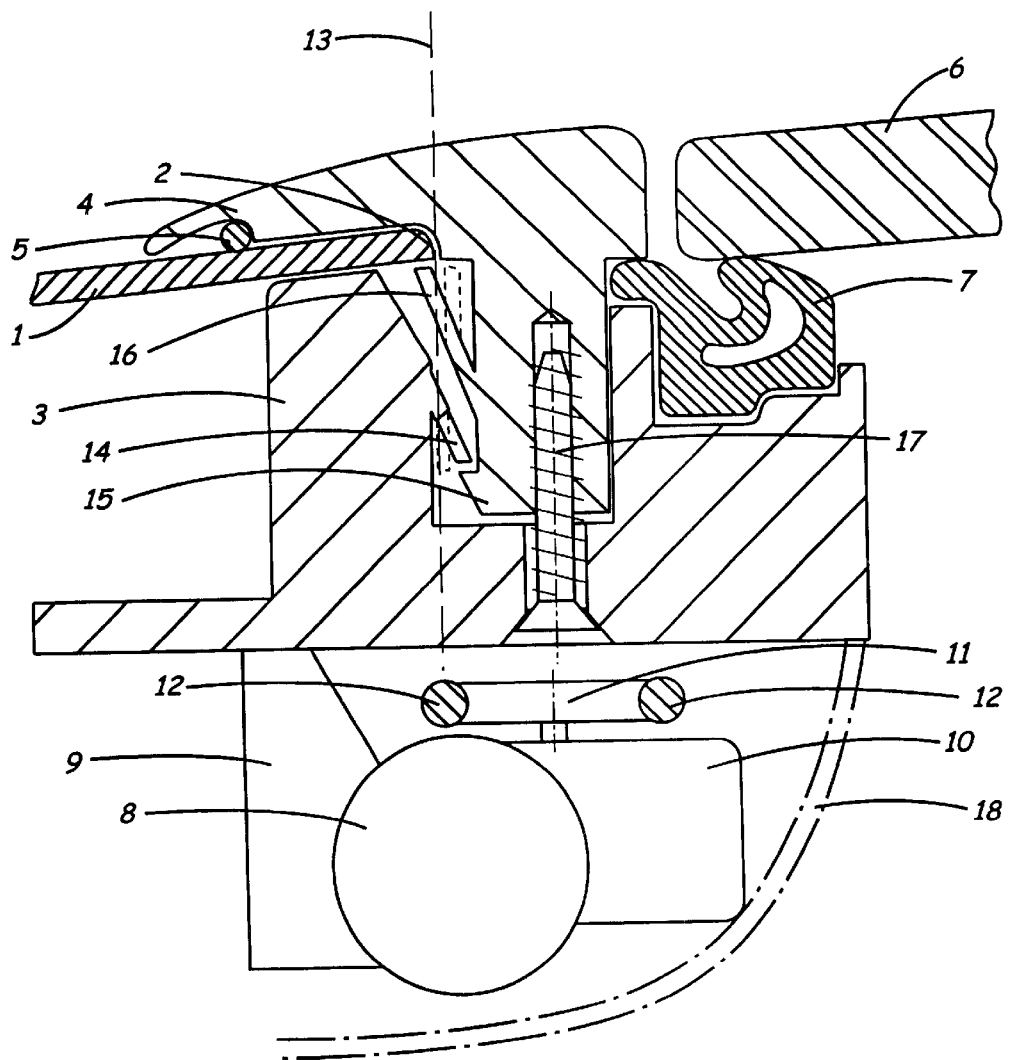

The figure shows part of the roof 1 of a vehicle. A roof opening comprising edges 2 is formed in said roof.

Mounted around the roof opening is a frame having, and in one embodiment, consisting of a lower frame 3 which is present on the underside of the roof 1 and an upper frame 4 which is, in the main, present on the upper side of the roof 1. Lower frame 3 and upper frame 4 can be fixed together, wherein roof 1, more in particular the edges 2 of the opening in said roof, can be confined therebetween. Furthermore sealing elements 5 can be used for sealing purposes.

A movable closure element 6 (for example a glass panel) is connected to the lower frame 3. In the illustrated, closed position the closure element 6 mates with a seal 7. Driving means mounted on lower frame 3 are used for driving the closure element 6. Merely by way of example, said driving means may include a driving motor 8, which is mounted on lower frame 3 by means of a fastening member 9 (only schematically indicated), a transmission 10, a driving wheel 11 and driving cables 12. When driving motor 8 is energized, driving wheel 11 is rotated and driving cables 12 are moved, as a result of which the closure element 6 is moved. Such driving means are known per se and need not be explained in detail herein.

As is apparent from the figure, the driving means are positioned at least partially outside the projection of the roof opening. Said projection is schematically indicated by dotted line 13. The advantage to be obtained by this is that a maximum effective roof opening can be achieved, without any problems arising when mounting the frame. After all, the lower frame 3 and the driving means mounted thereon is positioned in abutment with the roof 1 from below.

In order to enhance the ease of mounting the lower frame 3 and the upper frame 4 include mating snap members. A resilient lip 14 of lower frame 3 can thus mate with a projection 15 of upper frame 4. Similarly, a resilient lip 16 of upper frame 4 can mate with roof opening edge 2.

Mounting Takes Place as Follows:

First the upper frame 4 is placed onto the roof opening edge 2 from above, possibly with the interposition of sealing element 5. Resilient lip 16 thereby snaps under roof opening edge 2. Then the lower frame 3 with the driving means mounted thereon is moved upwards from below until resilient lip 14 has snapped behind projection 15. The two frames are now interconnected already. Then the fixing elements, such as screws 17 or the like are used for firmly interconnecting the two frames 3 and 4 while confining the roof opening edges 2. This mounting of the open roof construction can be carried out single-handedly by one person.

A chain-dotted line schematically indicates an inner liner 18 of the vehicle. Owing to the above-described way of mounting, such an inner liner 18 can already be formed integrally with the lower frame 3, so that the mounting thereof takes place simultaneously with the mounting of the lower frame 3.

The invention is not limited to the above-described embodiment, which can be varied in several ways without departing from the scope of the claims.

What is claimed is:

1. An open roof construction for a vehicle, comprising a frame mounted around a roof opening, the frame including a member that is deflectable to allow insertion through the roof opening and is resilient to engage an edge of the roof opening, a movable closure element cooperating with the frame to open and close the roof opening, and a drive for said closure element, which is mounted on said frame, which frame includes a lower frame present on the underside of the roof and an upper frame present on the upper side of the roof, which lower frame and which upper frame include fixing elements for fixing the two frames together while confining the edges of the roof opening, wherein the drive is mounted on said lower frame.

2. The open roof construction according to claim 1, wherein the drive is mounted on the lower frame extending outside the projection of the roof opening.

3. The open roof construction according to claim 1, wherein said lower frame and said upper frame include mating snap members.

4. The open roof construction according to claim 1, wherein the lower frame is integral with a roof liner for the vehicle.

5. The open roof construction according to claim 2, wherein said lower frame and said upper frame include mating snap members.

6. The open roof construction according to claim 1, wherein the upper frame includes the deflectable member.

7. An open roof construction for a vehicle, comprising a frame mounted around a roof opening, the frame including an upper frame and a lower frame wherein one of the upper frame and the lower frame include a member that is deflectable to allow insertion through the roof opening and is resilient to engage an edge of the roof opening, and a movable closure element cooperating with the frame to open and close the roof opening.

8. The open roof construction according to claim 7, wherein said lower frame and said upper frame include mating snap members.

9. The open roof construction according to claim 8 and further comprising a fixing element adapted to secure the upper frame and the lower frame together, wherein portions of the upper frame and the lower frame confine the edge of the roof opening therebetween.

10. The open roof construction according to claim 7, wherein the lower frame is integral with a roof liner for the vehicle.

11. The open roof construction according to claim 7, wherein the upper frame includes the deflectable member.

12. A method for installing a frame of open roof construction in a roof opening of a vehicle, the method comprising:

installing a first frame portion in the roof opening, wherein a deflectable member of the first frame portion is deflected while the first frame portion is being pushed through the roof opening, the deflectable member being resilient to engage an edge of the roof opening and inhibit removal upon reaching a selected position; and securing a second frame portion to the first frame portion that has extended through the roof opening.

13. The method of claim 12 wherein the first frame portion comprises an upper frame portion and wherein installing comprises installing the upper frame portion from above the roof opening.

14. The method of claim 13 wherein the first frame portion and the second frame portion include mating snap members, and wherein securing includes attaching the first frame portion and the second frame portion using the mating snap members.

15. The method of claim 14 wherein securing includes attaching the first frame portion to the second frame portion using fixing elements after the mating snap members have attached the first frame portion and the second frame portion wherein portions of the first frame and the second frame confine the edge of the roof opening therebetween.

16. The method of claim 12 wherein securing includes attaching the first frame portion to the second frame portion using fixing elements.

* * * * *